United States Patent
Churchland et al.

(10) Patent No.: US 7,067,035 B2
(45) Date of Patent: Jun. 27, 2006

(54) MICROWAVE PREHEAT PRESS ASSEMBLY

(75) Inventors: Mark T. Churchland, Vancouver (CA);
Robert L. Pike, Vancouver (CA)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 11/078,264

(22) Filed: Mar. 11, 2005

(65) Prior Publication Data
US 2005/0155703 A1   Jul. 21, 2005

Related U.S. Application Data

(62) Division of application No. 10/265,041, filed on Oct. 3, 2002.

(51) Int. Cl.
*H05B 6/70* (2006.01)
*H05B 6/78* (2006.01)

(52) U.S. Cl. .............................. 156/379.6; 156/272.2; 156/275.5; 264/109; 264/489; 34/259

(58) Field of Classification Search ..................... None
See application file for complete search history.

(56) References Cited

U.S. PATENT DOCUMENTS

| 4,456,498 A | 6/1984 | Churchland |
| 4,731,250 A | 3/1988 | Stark |
| 5,228,947 A * | 7/1993 | Churchland .............. 156/580.1 |
| 5,892,206 A | 4/1999 | Harris et al. |

* cited by examiner

*Primary Examiner*—Sam Chuan Yao
(74) *Attorney, Agent, or Firm*—Christensen O'Connor Johnson Kindness (57) ABSTRACT

The present invention is a microwave preheat press. The microwave preheat press includes a first and a second press section which define a press passage therebetween. A compression belt movable along the press passage is contiguous with one of the press sections. The press passage is configured such that it has an initial press section leading into a final press section. A microwave generator is in communication with a microwave waveguide applicator structure assembly such that microwave energy is created and transmitted through the microwave waveguide assembly into the initial compression section.

14 Claims, 7 Drawing Sheets

MICROWAVE PREHEAT PRESS ASSEMBLY

CROSS REFERENCE TO RELATED APPLICATION

This application is a divisional of U.S. application Ser. No. 10/265,041, filed Oct. 3, 2002, the benefit of which is hereby claimed under 35 U.S.C. § 120.

FIELD OF THE INVENTION

The present invention relates to systems and methods of forming composite wood products and more specifically to systems and methods of forming composite wood products using a microwave preheat press assembly.

BACKGROUND OF THE INVENTION

Many processes are known in the art for forming a composite wood element product from a composite mat assembly of resin coated wood elements. For example, steam and microwave energy have been used in conjunction with a variety of press assemblies to heat the mat assembly to about the cure temperature of the resin and compress the mat assembly to a desired final dimension. However, the designs of the prior press assemblies are relatively inefficient.

Steam injection heating sources unduly limit the size of the composite wood element products that can be formed. The heat carried by the steam must naturally conduct into the central portion of the product to raise the product to the cure temperature. Natural flow through a wood product is limited to certain thicknesses for certain products. Products over 5 inches thick can be very difficult to evenly heat. Further, steam injection presses are fixed in length and are not continuous in operation, limiting the length of the product. Thus, steam injection heating does not allow the production of relatively larger wood element products. By limiting the size of product that can be produced from a given press assembly the press assemblies ultimate utility is limited.

Traditional microwave heating systems have helped solve some of the heat transfer problems. However, the design of these microwave heating systems creates another problem. More specifically, current designs have no balance between the time at which a mat assembly reaches the cure temperature and the time in which the same mat assembly reaches a fully compressed state. The result is either a mat assembly where the resin is cured before reaching final compression or a failure to bring the mat to the optimal temperature at all. The percentage of the energy that can be delivered by preheat is thus limited. In both cases an undesirable result is attained.

Press assemblies using microwave applicators directing microwave energy into the sides of the mat assemblies have been developed in an attempt to address these issues. However, the side application systems have their limits as well. Placing a microwave waveguide assembly within a press limits the type of press assemblies that can be used. More specifically, many press assemblies are designed such that it is physically impossible to place a waveguide assembly at the side of the press. Consequently, press assemblies that may otherwise be highly desirable for other reasons may be prevented from being used by their design.

Examples of various microwave curing systems are U.S. Pat. No. 5,228,947 issued Jul. 20, 1993, U.S. Pat. No. 6,290,809 B1, issued Sep. 18, 2001, U.S. Pat. No. 6,242,726 B1, issued Jun. 5, 2001, U.S. Pat. No. 4,020,311, issued Apr. 26, 1977, U.S. Pat. No. 4,456,498, issued Jun. 26, 1984 and U.S. Pat. No. 6,176,951 B1, issued Jan. 23, 2001. All of which are incorporated herein by reference.

SUMMARY OF THE INVENTION

The present invention relates to an improved system and method for applying microwave energy for curing a composite wood product within a press assembly.

The present invention is a microwave preheat press. The microwave preheat press includes a first and a second press section which define a press passage therebetween. A compression belt movable along the press passage is contiguous with one of the press sections. The press passage is configured such that it has an initial press section leading into a final press section. A microwave generator is in communication with a microwave waveguide assembly such that microwave energy is created and transmitted through the microwave waveguide assembly into the initial compression section.

The present invention also includes an improved method of forming a consolidated composite wood product from a mat assembly formed of discrete wood elements coated with a resin having an effective cure temperature. The method includes introducing the mat assembly into an initial compression section of a press; directing an amount of microwave energy into the mat assembly while the mat assembly is within the initial compression section; compressing the mat assembly into a final compression state. The amount of microwave energy is sufficient to bring the mat assembly to, or very close to, the cure temperature of the resin as the mat assembly reaches a final compression state or shortly thereafter.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a system and method for forming composite wood element products using a microwave preheat. By way of overview, and with references to FIG. 1, one presently preferred embodiment includes a microwave preheat press 10. The microwave preheat press 10 includes a first press section 11 and a second press section 13 that define a press passage 15 therebetween. The press passage 15 is configured to define a preheat section 19, an initial compression section 21 and a final compression section 22. A microwave impervious compression belt 12, 14 is contiguous each press section 11, 13, respectively. A microwave generator 54 is used to generate microwave energy. A microwave waveguide applicator structure assembly 40 is adjacent the initial compression section 21 and is configured to direct microwave energy from the microwave generator 54 into the initial compression section 21. Specific details of the microwave preheat press 10 are described in more particularity below.

Figure 1:
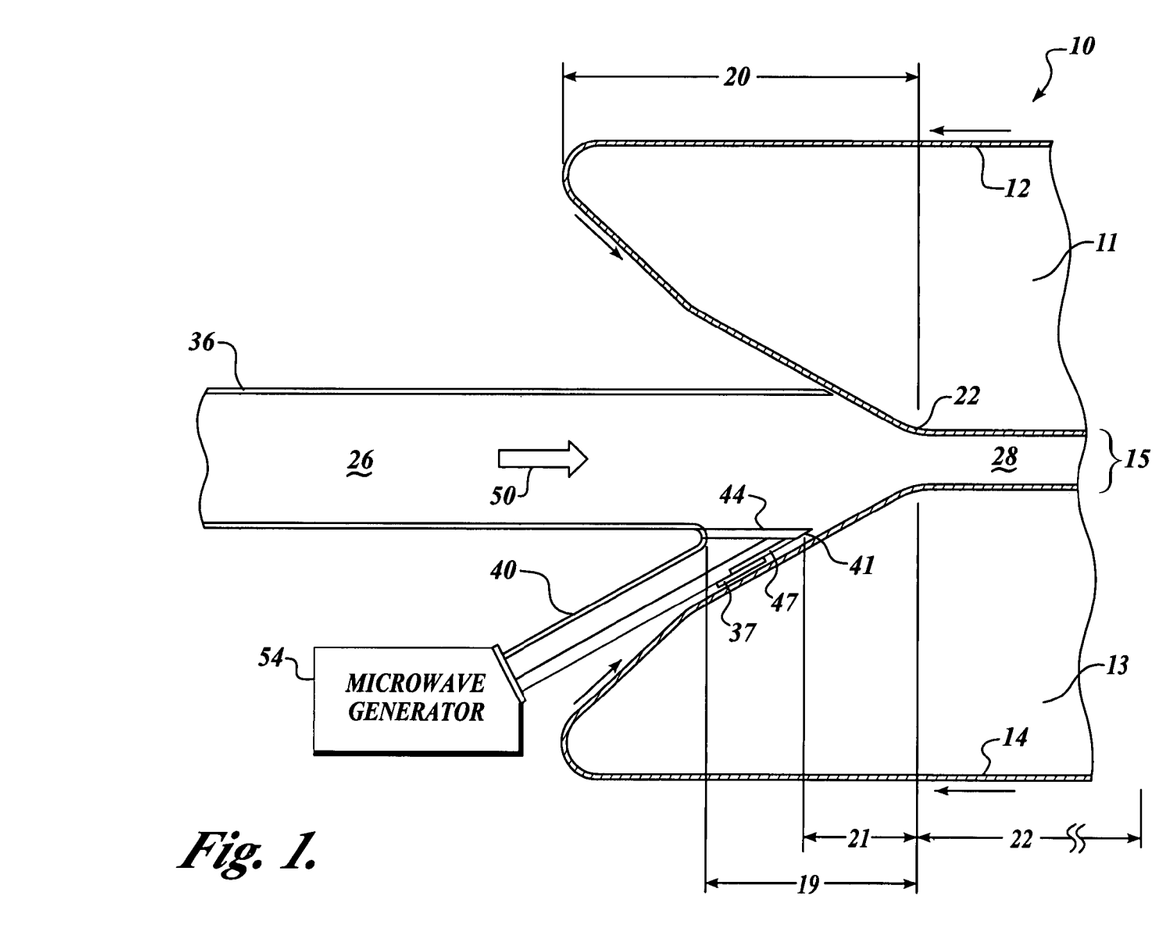
FIG. 1 is a side view of the press assembly with microwave pre-heat according to the present invention.

Referring now to FIG. 1, the present invention is preferably used to form composite wood element products 28 from a mat assembly 26. The mat assembly 26 preferably comprises an arrangement of wood elements, such as strands, chips, strips, veneer or particles coated with a resin having a cure temperature, and that can be subjected simultaneously to pressure and microwave energy to form a composite wood element product 28. Suitable, non-limiting examples of such composite wood element products 28 include particleboard, fiberboard, waferboard, plywood, oriented strand board, laminated veneer lumber, parallel strand lumber, and laminated beams. The dimensions of the composite wood element products 28 formed by the present invention will be a matter of choice within the discretion of those skilled in the art.

The resin used to coat the wood elements of the mat assembly 26 is preferably an alkaline phenolic resin. However, any adhesive whose rate of cure is accelerated by the application of heat may be used with the present invention. Non-limiting examples of such resins are water soluble and non-water-soluble alkaline and acidic phenolic resins, resorcinol-formaldehyde resins, urea-formaldehyde resins, and isocyanate resins. The resins may be applied to the wood elements in any desired amount, or as necessary to form the specific compressed composite wood element product.

Continuous belt-type presses employable with the present invention are known in the art. As such, a detailed description of their structure is not necessary for the understanding of this invention. The continuous press used in the present invention generally includes a first press section 11 and a second press section 13. The press sections 11, 13 are spaced apart to form a press passage 15 therebetween through which the mat assembly 26 may be passed. Suitable examples of press-types useable with the present invention are continuous presses made by Metso or Dieffenbacher.

The first and second press sections 11, 13 define an entrance section 20. The entrance section 20 is suitably arranged to receive the mat assembly 26. Part of the entrance section 20 is an initial compression section 21. The initial compression section 21 is considered that part of the press where the mat assembly 26 is being compressed, but has not yet been fully compressed. The final compression section 22 is the press section wherein the mat assembly 26 is at a full compressed state.

The compression belts 12, 14 are preferably stainless steel belts. However, other types of metal belts such as molybdenum belts may be used. Further, the compression belts 12, 14 may optionally be coated with a plastic material (not shown). For example, stainless steel press belts coated with a film of polytetrafluoroethylene may be used. Alternatively, compression belts 12, 14 having a metal coating on a non-metallic support may be used.

The microwave waveguide applicator structure assembly 40 is preferably positioned adjacent one of the compression belts 12, 14 so that the leading end 41 is substantially in contact with their respective belts 12 and 14. Contact is not required within the scope of the invention but it is preferable to be as close as practical. Separations of many inches are acceptable. The microwave waveguide applicator structure assembly 40 is configured to direct microwave energy from the microwave generator 54 through window 44 and into mat assembly 26 while the mat assembly 26 is within the initial compression section 21.

Figure 2:
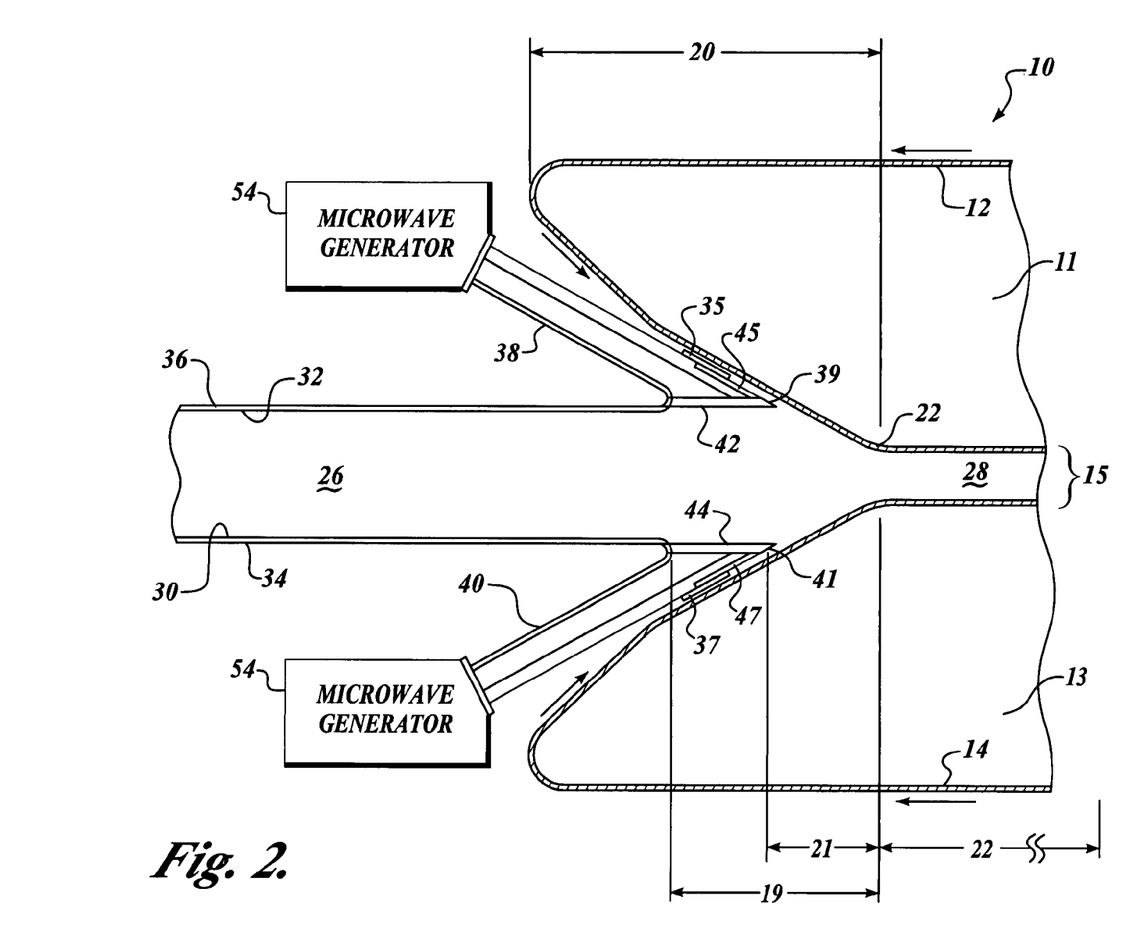
FIG. 2 is side view of another embodiment of the present invention.

As best illustrated in FIGS. 1 and 2, suitable chokes 45, 47 may be positioned at the leading ends 39, 41 to inhibit arcing between the microwave waveguide assembly applicator structure 38, 40 and their adjacent belt 12, 14, respectively. The structure of such chokes 45, 47 is well known in the art and may be of any suitable form. Also, to insure proper positioning, the microwave waveguide applicator structure assembly 40 may be provided with any commonly used wear plate 35, 37, or similar device. Further, suitable windows 42, 44 may also be used to allow the entrance of microwave energy while providing support for the mat assembly 26. Also, in the regions around the microwave waveguide applicator structure assembly 40, suitable microwave type structures 52, such as dielectric spacers (FIG. 3) may be used to help control the microwave energy.

Optionally, microwave heating in the press may be supplemented by heating the press belts conventionally, e.g., by heating platens (not shown) over which the belts may run, using, for example, steam or oil. The platen heating can both increase the final rate of cure and prevent the press surfaces from prematurely cooling the pressed assembly. Means for implementing such conventional press heating are well known in the art.

Figure 6:
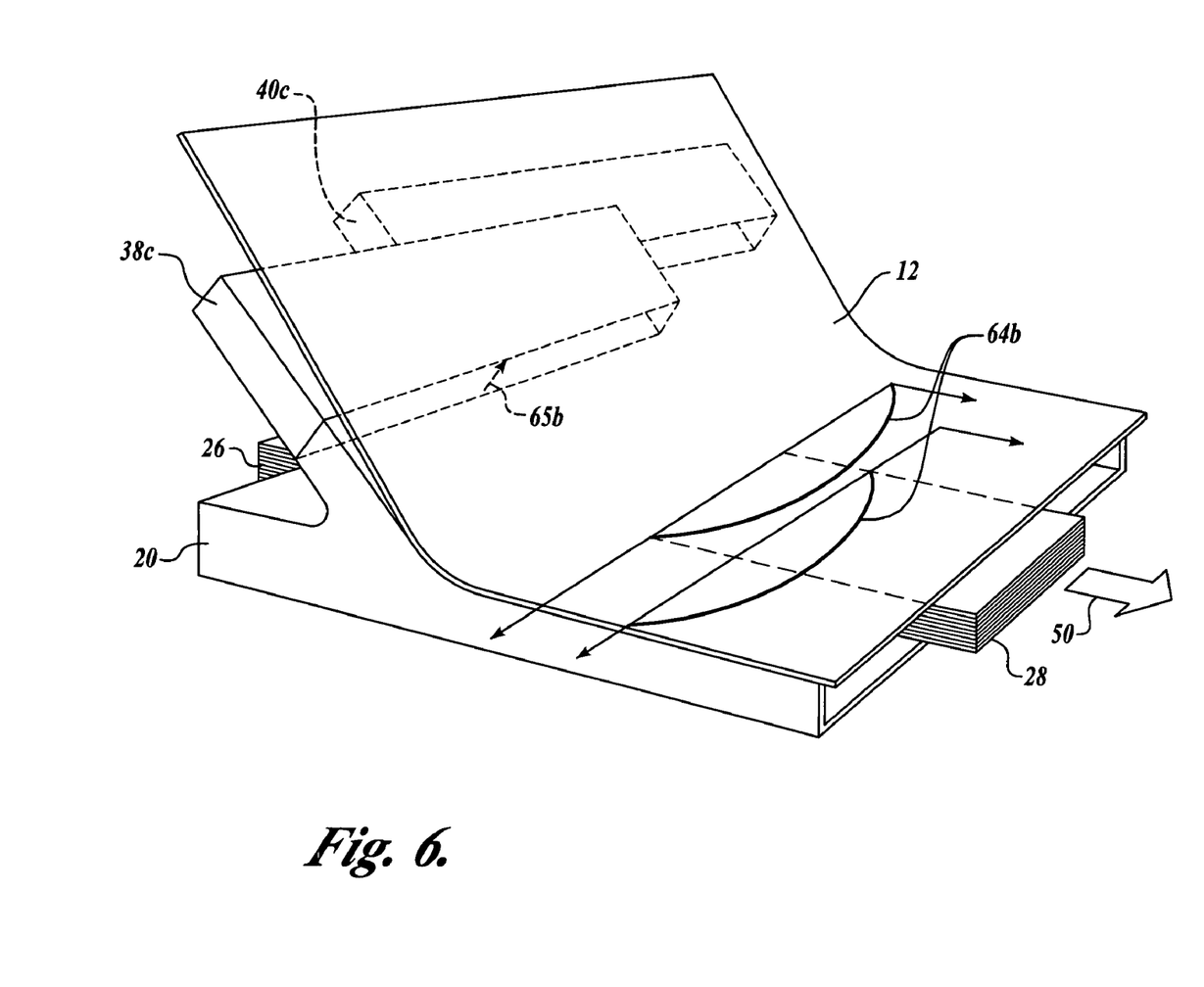
FIG. 6 is perspective view of yet another embodiment of the present invention; and, FIG. 7 is perspective view of additional embodiment of the present invention.
Figure 7:
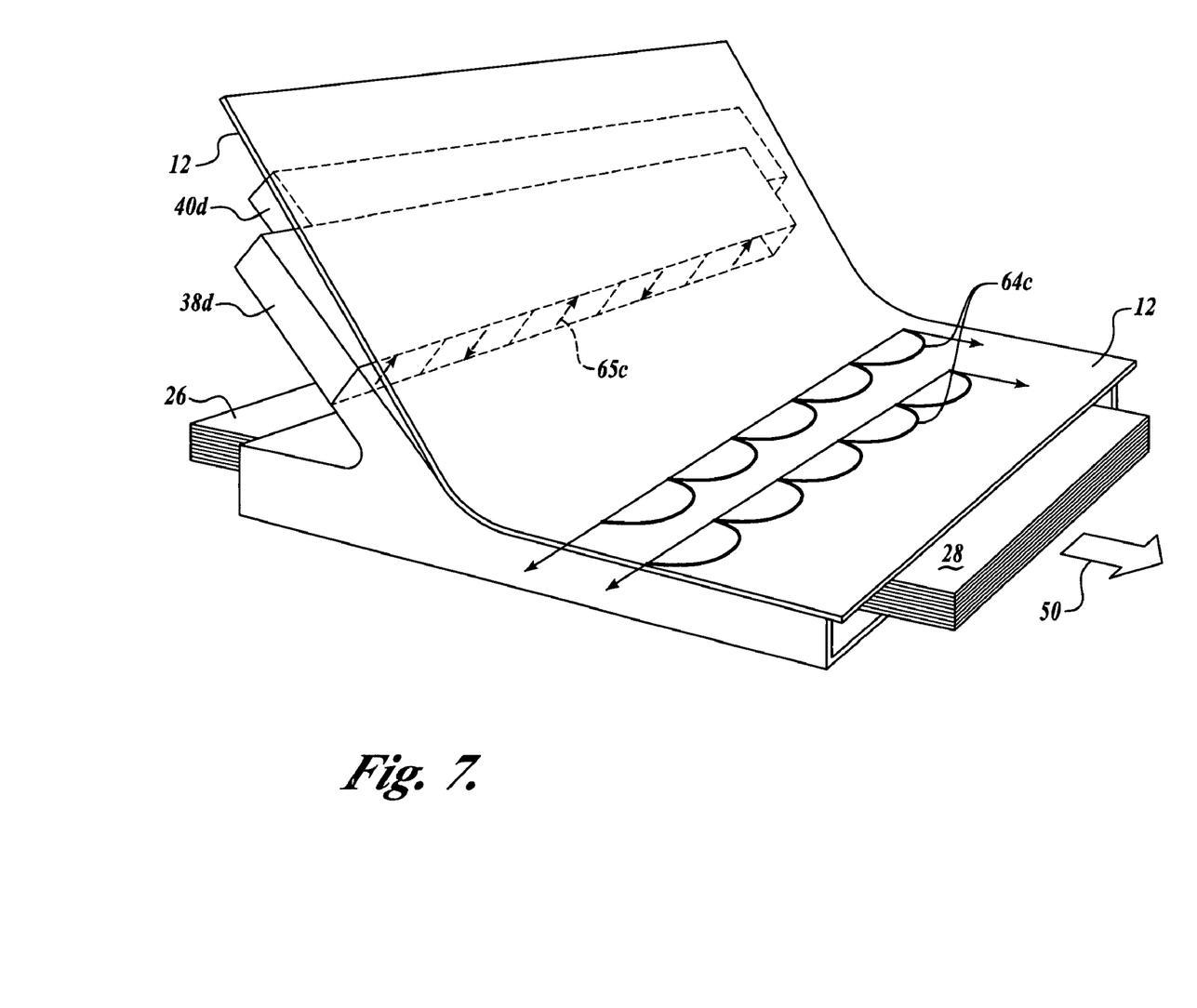

The number and overall arrangement of the microwave waveguide applicator structure assembly 40 employed with the present invention is not intended to limit the present invention. More specifically, FIG. 1 discloses only one microwave waveguide applicator structure assembly 40 located on the bottom of the microwave preheat press 10. However, the microwave waveguide applicator structure assembly 40 could just as easily be placed on the top. Alternatively, two or more independent microwave generators 54 may be used with separate waveguide applicator structure assemblies 38b, 40b. These multiple sources may be arranged on the same or opposite sides of the press passage 15. FIG. 2, depict an arrangement where a single microwave waveguide applicator structure assembly 38b, 40b is located on both the top and bottom of the microwave preheat press 10. FIGS. 6 and 7 depict another possible arrangement, where multiple microwave waveguide assembles 38c, 40c, 38d and 40d are employed on a single side of the microwave preheat press 10. Additionally, combinations of these embodiments (not shown) also considered within the scope of this invention.

Figure 3:
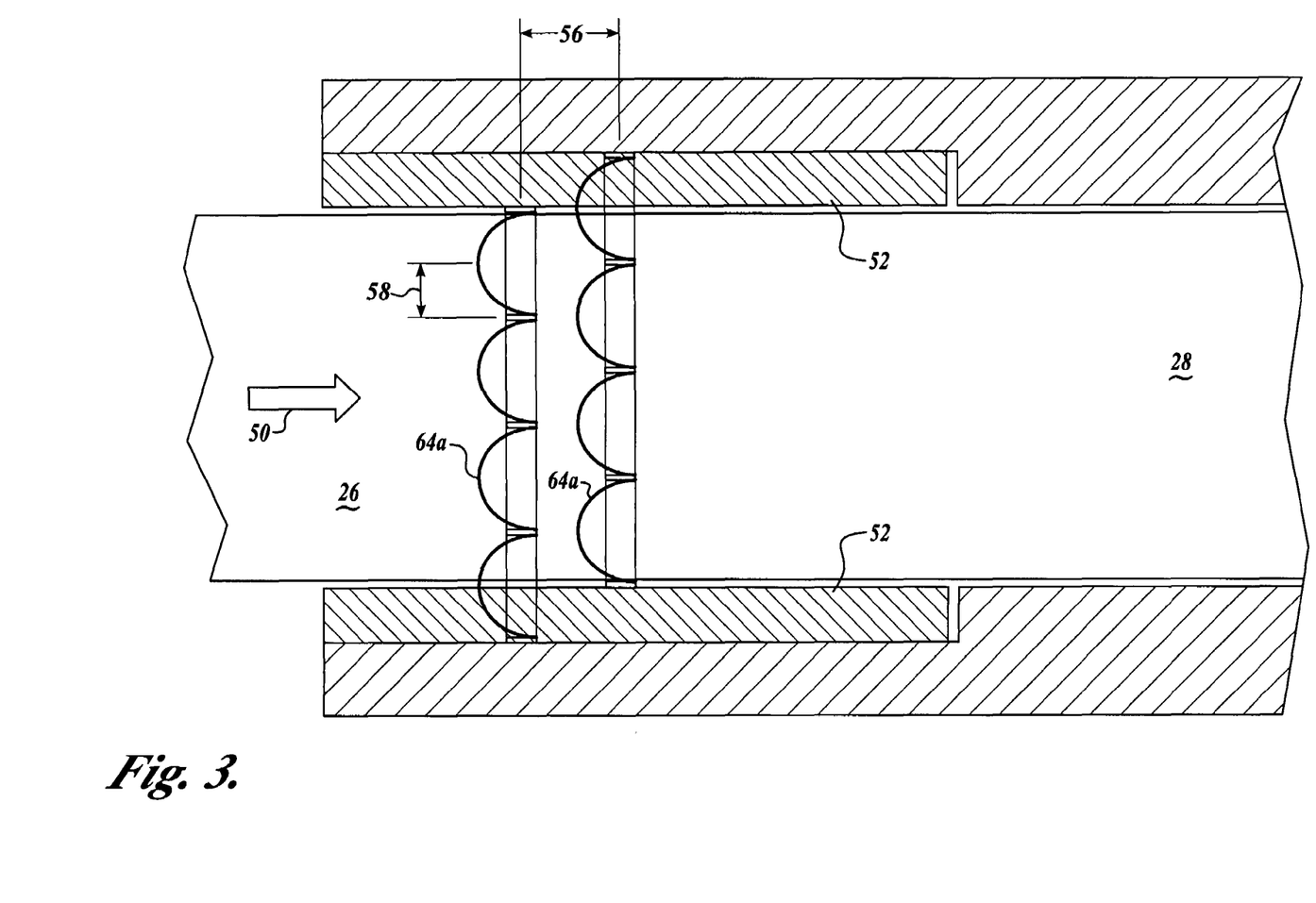
FIG. 3 is a top schematic view of various aspects depicted in FIG. 1.
Figure 4:
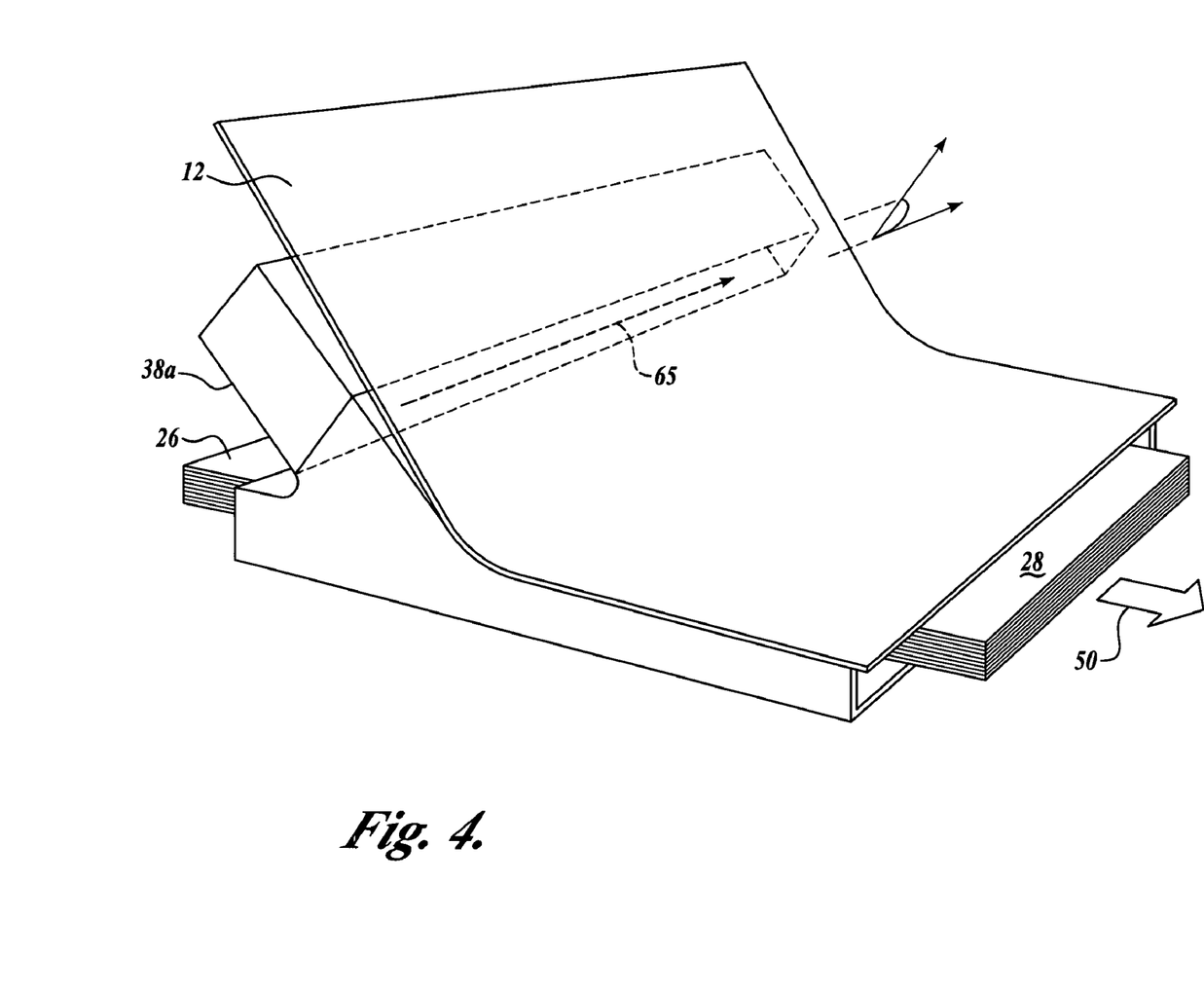
FIG. 4 is perspective view of an embodiment of the present invention.

As depicted in FIG. 3, it is preferable that when multiple points of application of the microwave energy are used that the points be staggered in the direction of 50 of the mat 26 entering press 10 by waveguide spacing 56. In a preferred embodiment, the waveguide spacing 56 is chosen to yield a substantially uniform heating pattern 64a, 64b, and 64c is achieved. However, the amount of waveguide spacing 56 is variable and may be determined by those skilled in the art. The wave guides 38 and 40 and the windows 42 and 44 may also be laterally offset by a waveguide offset 58, as best seen in FIG. 3. It will be appreciated that both the waveguide spacing 56 and the waveguide offset 58 may be selected to achieve a more even heating pattern 64.

To this end, the waveguide offset 58 is preferably equal to about ½ the waveguide width. In this manner, the peaks of energy from one window 42 are aligned with the valleys of the energy peaks applied through the other window 44 and vice versa thereby more uniformly apply microwave energy across the lay-up.

In a presently preferred embodiment, a microwave generator 54 producing microwave energy at a frequency of 915 MHz is preferred. However, other microwave frequencies are considered within the scope of this invention. For example, it has been found that frequencies as low as about 95 MHz can be employed. The upper frequency limit is not critical and is set by practical considerations, since there is a direct relationship between the optimum size of a waveguide and the frequency of the electromagnetic wave that can be conducted through it. Accordingly, any microwave frequency ranging from at least about 95 MHz is considered within the scope of this invention.

Commercially available microwave generators 54 which may be effectively employed in the practice of the invention include, inter alia, Cober Electronics and Microdry Magnetrons having a power output of 75–100 kW and operating at 915 MHz, or klystrons which are available at a variety of power outputs and frequencies.

The amount of microwave energy applied to the mat assembly 26 is variable and will depend upon various factors such as the nature of the wood elements and the properties of the resin coating. Regardless, the amount of microwave energy applied to the mat assembly is preferably an amount sufficient to bring the mat assembly 26 to a temperature at least equal to the cure temperature of the resin while the mat assembly is still within the initial compression section 21. Preferably, the mat assembly 26 is brought up to at least the cure temperature at the time the mat assembly enters the final compression section 22. Alternatively, the mat assembly 26 may be brought to above the cure temperature after the mat assembly 26 enters the final compression section 22. Again, alternatively the mat may be brought to a temperature less than the cure temperature and the hot platens of the press will supply the final energy needed to cure the assembly. For some products this is preferred and it is within the scope of the invention. These results are accomplished by controlling several variables.

One variable that is controlled to achieve the desired heating of the mat assembly 26 is by moving the mat assembly 26 past the microwave sources at a suitable linear speed. One skilled in the art may determine linear speeds. By way of non-limiting example, when using phenol-formaldehyde resins, the linear rate may be controlled so the temperature for mat assembly 26 may range from about 100° C. to about 170° C. In a preferable arrangement the temperature may be within a range from about 110° C. to about 150° C. More preferably the mat assemblies 26 are heated to a range from about 115° C. to about 120° C. In applications where finishing the curing is best done in the press temperature ranges from about 80 degrees C. to about 98 degrees C. may be preferred.

The linear feed rate at which the mat assembly 26 enters the microwave preheat press 10 is variable and is dependent upon the nature of the composite wood element product 28 being formed. In a presently preferred embodiment, a linear feed rate within the microwave preheat press 10 will range from about 0.5 feet per minute to about 150 feet per minute. In a particular embodiment, the linear feed rate is from about 1 to about 30 feet per minute. However, the present invention is not limited by the linear feed rate. As such, feed rates above and below the preferred feed rates are considered within the scope of this invention.

Another variable that is controlled to achieve the desired heating of the mat assembly 26 is the control of the microwave waveform. It is preferable for the microwaves to be propagated in the waveguide assembly 40 in a $TE_{N0}$ mode, where N is any integer. In a particular embodiment the N is equal to 1, yielding a $TE_{10}$ mode. However, a $TE_{N0}$ mode where N is any integer greater than one is also within the scope of this invention. Additionally, a waveguide assembly 40 producing a waveform having a $TE_{N0}$ mode is also considered within the scope of this invention. In this particular embodiment, the N is also equal to 1, or any integer greater than 1.

Figure 5:
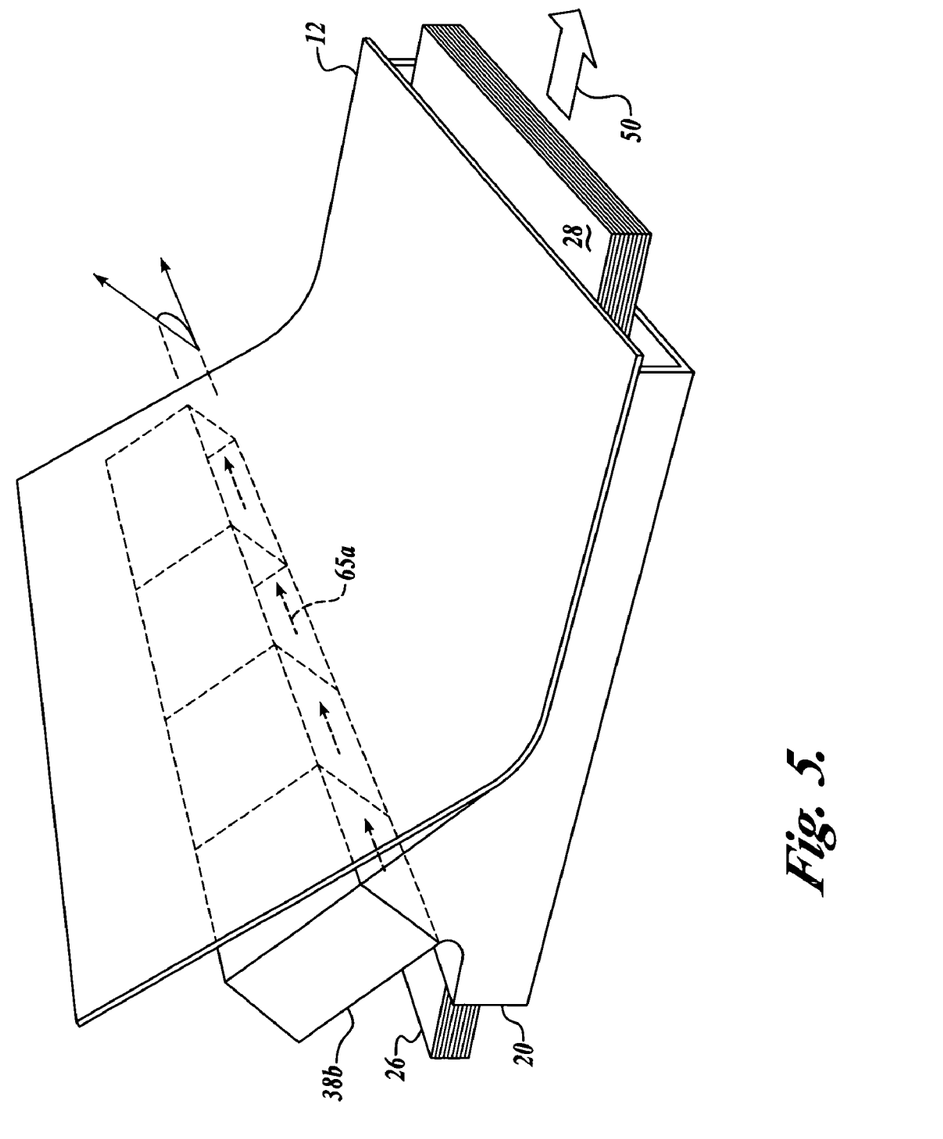
FIG. 5 is perspective view of another embodiment of the present invention.

Referring now to FIGS. 4–7, the microwave waveguide applicator structure assembly 40 is also preferably configured such that the electric vectors 65, 65a, 65b and 65c are oriented substantially perpendicular to direction of travel 50 of the mat assembly 26. As will be understood by those having skill in the art, there are two planes in which a vector may be perpendicular to a third plane. As such, FIGS. 5 and 7 depict various orientations for the electric vectors 65.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of forming a composite wood element product, comprising:
   introducing a mat assembly of discrete wood elements coated with a resin into an initial compression section of a press, the press having a first and a second press section defining therebetween a press passage and further having a compression belt moveable along said press passage contiguous with one of said press sections;
   directing microwave energy into the mat assembly via a microwave waveguide applicator structure assembly adjacent the initial compression section, disposed between a fibrous mat and the compression belt, wherein the microwave energy is directed while the mat assembly is within the initial compression section; and
   compressing and curing the composite wood mat assembly into a final compression state.

2. The method of claim 1, wherein the microwave energy is applied to the mat assembly in a $TE_{N0}$ mode.

3. The method of claim 2, wherein the N in the $TE_{N0}$ wave mode is equal to 1.

4. The method of claim 2, wherein the N in the $TE_{N0}$ wave mode is and an integer greater than 1.

5. The method of claim 1, wherein the microwave energy is applied to the mat assembly in a $TE_{N0}$ mode.

6. The method of claim 5, wherein the N in the $TE_{N0}$ wave mode is equal to 1.

7. The method of claim 5, wherein the N in the $TE_{N0}$ wave mode is an integer greater than 1.

8. The method of claim 1, wherein the microwave energy is an amount sufficient to raise the temperature of the mat assembly to about the cure temperature of the resin before the mat assembly reaches the final compression state.

9. The method of claim 1, wherein the microwave energy is an amount sufficient to raise the temperature of the mat assembly to about the cure temperature of the resin at substantially the same time the mat assembly reaches the final compression state.

10. The method of claim 1, wherein the microwave energy is an amount sufficient to raise the temperature of the mat assembly to about the cure temperature of the resin after the mat assembly reaches the final compression state.

11. The method of claim 1, wherein the mat assembly is an assembly of wood elements in the form of at least one of a wood strand, chip, strip, veneer and particle.

12. The method of claim 1, wherein the composite wood product is at least one of a particleboard, fiberboard, waferboard, plywood, oriented strand board, laminated veneer lumber, parallel strand lumber, and laminated beam.

13. The method of claim 1, further comprising controlling the linear speed of the mat assembly through the press so the mat assembly reaches the cure temperature as the mat assembly enters the final compression state.

14. The method of claim 1, wherein the mat assembly is heated by the microwave energy to a temperature below the cure temperature of the resin.

* * * * *